(12) United States Patent
Quintanilla Salas et al.

(10) Patent No.: US 11,365,788 B2
(45) Date of Patent: Jun. 21, 2022

(54) MOWER DRIVE BELT TENSIONER ARM

(71) Applicant: DEERE & COMPANY, Moline, IL (US)

(72) Inventors: Juan Quintanilla Salas, Monterrey (MX); Kyle Ressler, West Bend, WI (US); Cesar Alfredo Ramirez Trevino, Monterrey (MX)

(73) Assignee: DEERE & COMPANY, Moline, IL (US)

( * ) Notice: Subject to any disclaimer, the term of this patent is extended or adjusted under 35 U.S.C. 154(b) by 277 days.

(21) Appl. No.: 16/670,550

(22) Filed: Oct. 31, 2019

(65) Prior Publication Data

US 2021/0131530 A1   May 6, 2021

(51) Int. Cl.
| | |
|---|---|
| *F16H 7/08* | (2006.01) |
| *F16H 7/02* | (2006.01) |
| *A01D 34/76* | (2006.01) |
| *A01D 101/00* | (2006.01) |
| *A01D 34/66* | (2006.01) |

(52) U.S. Cl.
CPC .............. *F16H 7/08* (2013.01); *A01D 34/76* (2013.01); *F16H 7/02* (2013.01); *A01D 34/66* (2013.01); *A01D 2101/00* (2013.01); *F16H 2007/0806* (2013.01); *F16H 2007/0891* (2013.01)

(58) Field of Classification Search
CPC .. A01D 34/76; A01D 2101/00; F16H 7/1281; F16H 2007/0893
USPC ................... 474/133, 135, 119, 121; 56/11.6
See application file for complete search history.

(56) References Cited

U.S. PATENT DOCUMENTS

| | | | | | |
|---|---|---|---|---|---|
| 3,142,193 | A | * | 7/1964 | Polko | F16H 7/1281 474/110 |
| 3,543,892 | A | * | 12/1970 | De Baillie | A01D 34/6812 192/224.1 |
| 4,068,452 | A | * | 1/1978 | Schaefer | A01D 69/10 192/224.2 |
| 4,102,114 | A | * | 7/1978 | Estes | A01D 34/662 56/15.2 |
| 4,231,215 | A | * | 11/1980 | Klas | A01D 34/30 56/11.6 |
| 4,511,348 | A | * | 4/1985 | Witdoek | F16H 7/12 474/109 |
| 4,925,437 | A | * | 5/1990 | Suzuki | F16H 7/1281 474/135 |
| 5,012,632 | A | * | 5/1991 | Kuhn | A01D 34/76 474/135 |
| 5,246,403 | A | * | 9/1993 | Uphaus | F16H 9/14 474/117 |
| 5,361,566 | A | * | 11/1994 | Hohnl | A01D 34/6806 56/11.6 |
| 5,390,479 | A | * | 2/1995 | Hutchison | A01B 71/06 56/11.3 |
| 5,769,747 | A | * | 6/1998 | Kuhn | A01D 34/6806 474/135 |

(Continued)

*Primary Examiner* — Henry Y Liu

(57) ABSTRACT

A mower drive belt tensioner arm includes an elongate body having a tension pulley to provide tension to a mower drive belt. One of a pair of rear draft towers on the mower deck supports the elongate body above the surface of the mower deck. A coil spring urges an end of the elongate body in a direction between the pair of draft towers. A pivotable belt keeper may be mounted to the tensioner arm without tools, and extends over the perimeter of the tension pulley.

5 Claims, 3 Drawing Sheets

(56) References Cited

U.S. PATENT DOCUMENTS

| | | | | |
|---|---|---|---|---|
| 6,176,071 | B1* | 1/2001 | Thorman | A01D 34/76 |
| | | | | 474/135 |
| 6,312,352 | B1* | 11/2001 | Holland | A01D 34/76 |
| | | | | 474/113 |
| 6,602,155 | B2* | 8/2003 | Buss | A01D 34/76 |
| | | | | 474/101 |
| 6,952,913 | B1* | 10/2005 | Crumly | A01D 34/76 |
| | | | | 56/11.6 |
| 7,913,479 | B2* | 3/2011 | Eavenson, Sr. | A01D 34/76 |
| | | | | 56/11.6 |
| 8,567,166 | B2* | 10/2013 | Minoura | A01D 34/76 |
| | | | | 56/11.6 |
| 9,750,184 | B2* | 9/2017 | Reichard | A01D 34/76 |
| 10,306,833 | B2* | 6/2019 | Smith | B60N 2/38 |
| 2004/0134176 | A1* | 7/2004 | Stineman | A01D 34/82 |
| | | | | 56/11.6 |
| 2005/0039430 | A1* | 2/2005 | Samejima | A01D 43/077 |
| | | | | 56/320.2 |

\* cited by examiner

MOWER DRIVE BELT TENSIONER ARM

FIELD OF THE INVENTION

This invention relates to rotary mower decks carried by tractors or other grass mowing machines. More specifically, the invention relates to a tensioner arm for tightening and retaining a mower drive belt.

BACKGROUND OF THE INVENTION

Tractors, utility vehicles or zero turn mowers used for lawn care may carry a mower deck covering two or more rotary cutting blades on the lower ends of vertically oriented spindles. The blade spindles may be rotated by one or more mower drive belts that engage drive pulleys mounted to the spindles above the top surface of the deck, which may be driven by a drive pulley connected to the engine or other power source. Mower drive belt tensioners are used to tension the belts into engagement with the driven pulleys. One or more brackets or other fasteners are used to attach mower drive belt tensioners to the top of a mower deck.

There is a need for a mower drive belt tensioner arm that is lower in cost, and that may be mounted to a mower deck using only the brackets that are necessary to support and connect the mower deck to a tractor or other vehicle. There is a need for a mower drive belt tensioner arm with a belt keeper that is low in cost, and may be installed or manually moved between a locked position and free position without the use of tools.

SUMMARY OF THE INVENTION

A mower drive belt tensioner arm includes an elongate body is pivotably mounted between a first end and a second end to a first rear draft tower on a mower deck. A spring connected to the first end of the tensioner arm urges it toward a second rear draft tower on the mower deck. A tensioner pulley is rotatably mounted to the second end of the tensioner arm, along with a pivotable belt keeper that has an interference fit with a slot in the tensioner arm.

DESCRIPTION OF THE PREFERRED EMBODIMENT

Figure 1:
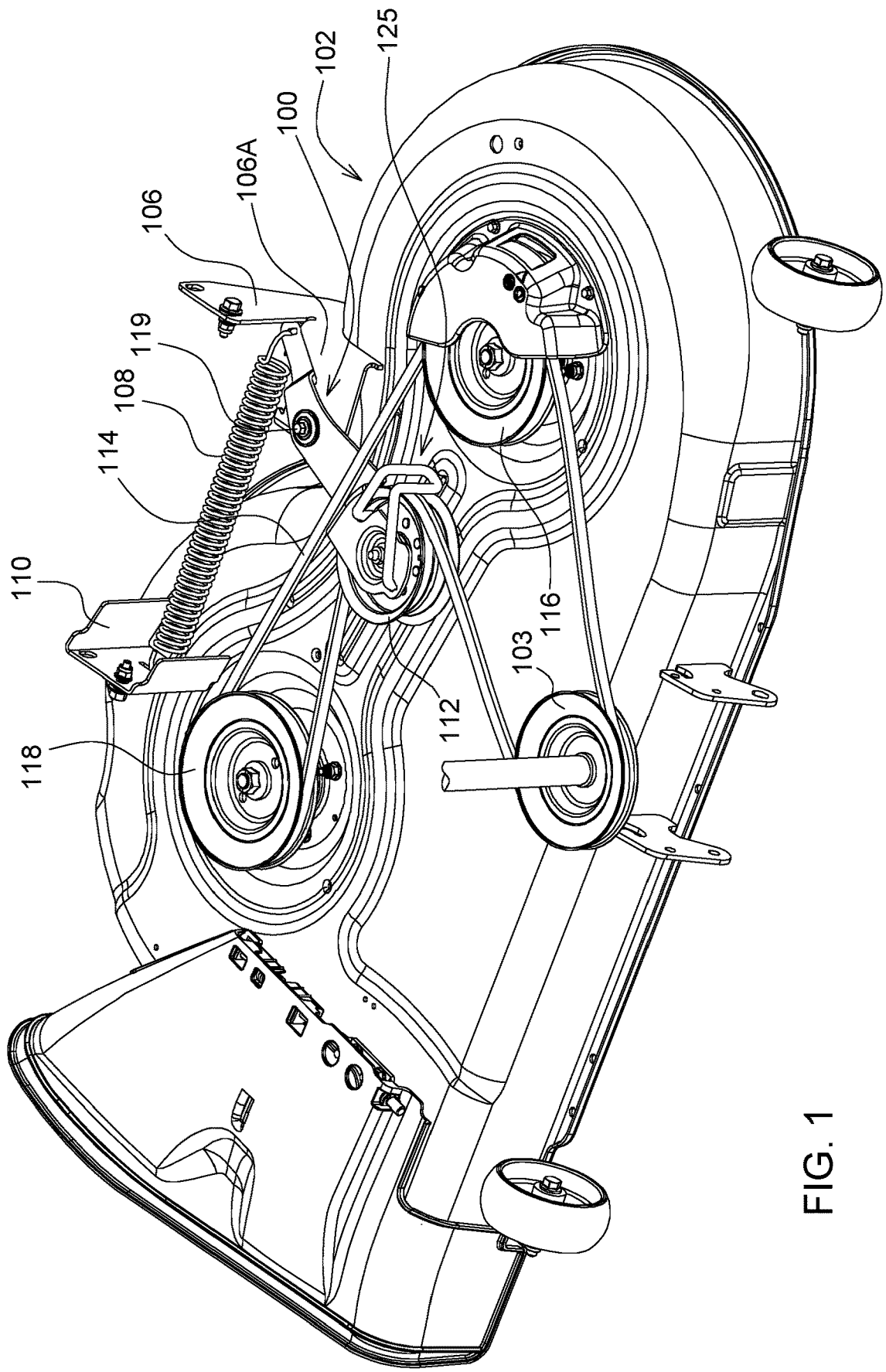
FIG. 1 is a perspective view of a mower deck with a mower drive belt tensioner arm according to a first embodiment of the invention.
Figure 2:
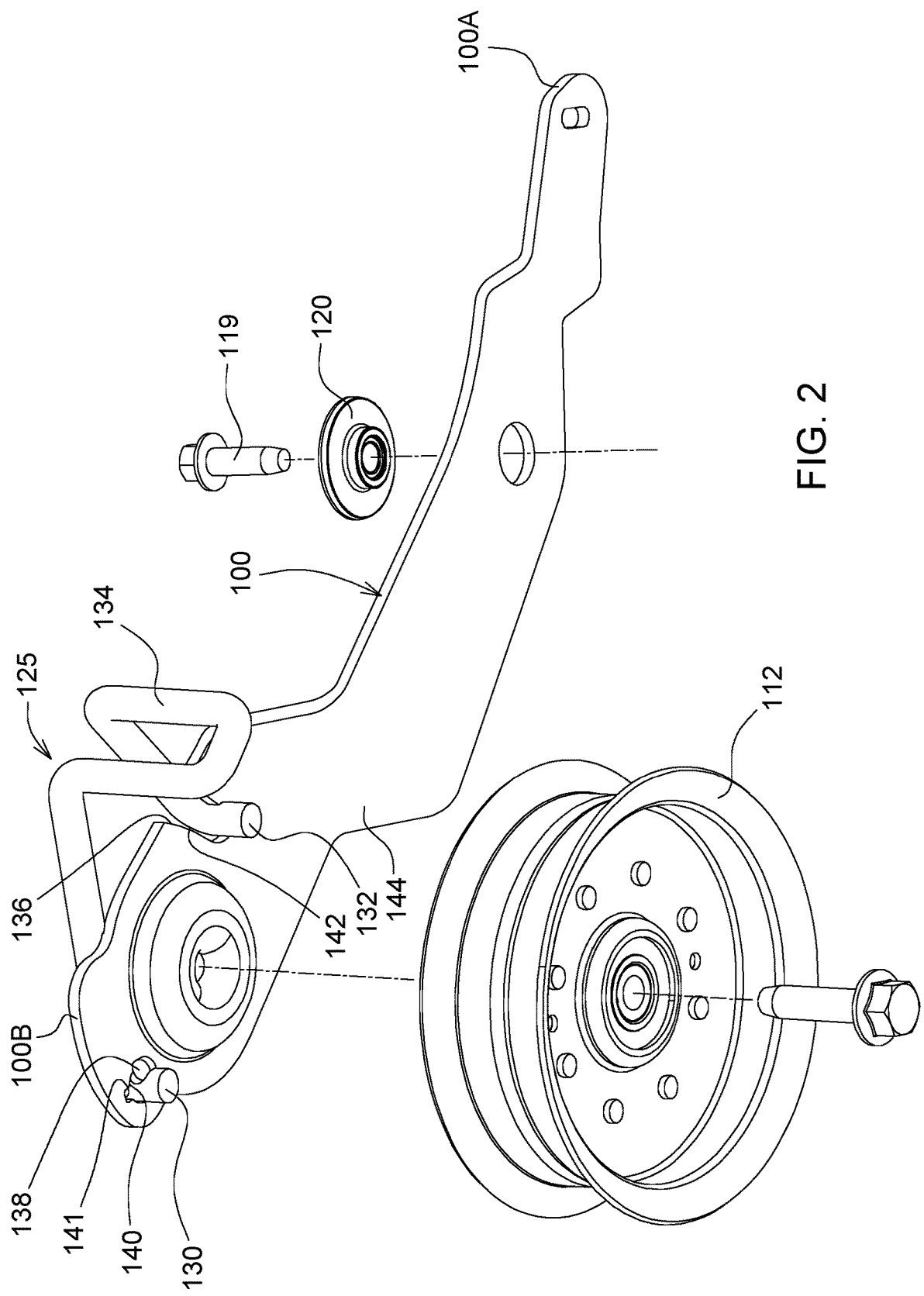
FIG. 2 is a partially exploded perspective view of a mower drive belt tensioner arm according to a first embodiment of the invention.

In a first embodiment shown in FIGS. 1-2, mower drive belt tensioner arm 100 may be used on mid-mounted mower deck 102 having mower drive belt 114. The mower drive belt may transmit power from drive pulley 103 to a plurality of driven pulleys 116, 118. The drive pulley may be powered by an internal combustion engine, battery or other power source, and the driven pulleys may be mounted to vertically oriented blade spindles supporting rotary mower blades for cutting grass. The tensioner arm is shown on a mower deck having two blade spindles, and also may be used on mower decks having three or more blade spindles.

In a first embodiment, tensioner arm 100 and tensioner spring 108 may be mounted entirely to rear draft tower brackets 106, 110 on the mower deck. The rear draft tower brackets may be sheet metal parts that are welded or fastened to the top and/or rear outer surface of the mower deck, and are required to connect the rear of the mower deck to left and right rear draft links in a four bar linkage supporting the mower deck under the tractor or other vehicle, and for raising and lowering the mower deck between different cutting heights. For example, the tensioner arm may be an elongate body that may be pivotably mounted, between the tensioner arm's first and second ends 100A, 100B, to horizontal surface 106A on left rear draft tower bracket 106. The pivotable mounting may include threaded fastener 119 extending through washer or bearing 120 and into the rear draft tower bracket. The tensioner spring may be connected between first end 100A of the tensioner arm and right rear draft tower bracket 110. Tensioner pulley 112 may be rotatably mounted to second end 100B of the tensioner arm. The elongate body of the tensioner arm may include step 144 between the first and second ends.

In a first embodiment, tensioner spring 108 may urge tensioner arm 100 and tensioner pulley 112 into a drive belt engaged position. The tensioner spring may pull first end 100A of the tensioner arm in a direction from left rear draft tower bracket 106 toward right rear draft tower bracket 110. This moves the tensioner pulley towards driven pulley 116 and against the mower drive belt, tightening the belt into engagement with driven pulleys 116, 118.

In a first embodiment, an operator may move tensioner arm 100 and tensioner pulley 112 into a drive belt disengaged position. The operator may move first end 100A of the tensioner arm in a direction from right rear draft tower 110 bracket toward left rear draft tower bracket 106. This moves the tensioner pulley away from driven pulley 116 and away from the mower drive belt, releasing the belt from engagement with driven pulleys 116, 118.

In a first embodiment, tensioner arm 100 may include belt keeper 125 which may help prevent derailment of mower drive belt 114 from tensioner pulley 112. The belt keeper may be in the form of a lever that may be manually installed on the tensioner arm, and moved between a locked position and a free or unlocked position, without the use of tools or fasteners. For example, the belt keeper may be a wire form having a first end 130 pivotably mounted to the tensioner arm, a second end 132 removably locked to the tensioner arm using a spring biased and/or interference fit, and an intermediate portion 134 between the first and second ends of the belt keeper, near the perimeter of tensioner pulley 112.

In a first embodiment, tensioner arm 100 may include belt keeper 125 having a first end 130 that may be manually inserted through hole 140 in the second end of tensioner arm 100. After the operator inserts the first end of the belt keeper through the hole, a groove or key feature 138 may trap the first end of the belt keeper in the hole, unless the operator pivots the belt keeper until the feature reaches a mating slot or notch 141 on the other side of the hole.

In a first embodiment, tensioner arm 100 may include belt keeper 125 having a second end 132 that may be engaged to tensioner arm, and having a spring biased and/or interference fit holding the belt keeper in the locked or engaged position. For example, the operator may insert the second end into slot 136, and reversibly stretch or bend the spring loaded belt keeper to slide the second end past shoulder 142 and into the locked or engaged position.

In a first embodiment, tensioner arm 100 may include belt keeper 125 that acts as a lever by pivoting toward the locked or engaged position, in the same direction of travel as mower drive belt 114. For example, when the mower drive belt contacts the belt keeper, the belt keeper may pivot and function as a lever to urge the second end of the belt keeper into the slot in the locked or engaged position.

Figure 3:
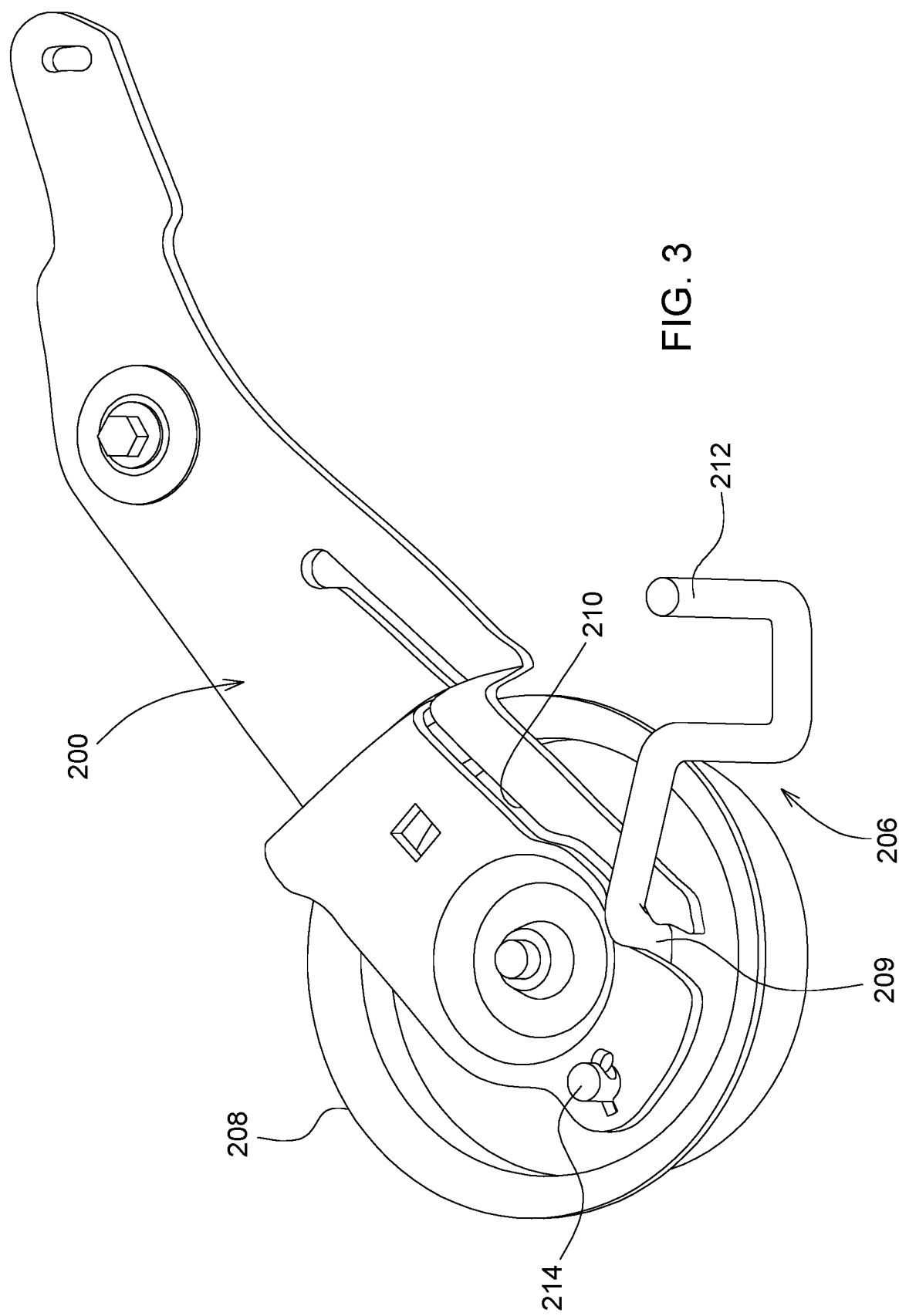
FIG. 3 is a partially exploded perspective view of a mower drive belt tensioner arm according to a second embodiment of the invention.

In a second embodiment shown in FIG. 3, tensioner arm 200 may include belt keeper 206 which may be a wire form having a first end 214 pivotably mounted to tensioner arm 200, a second end 212 which may be near the perimeter of tensioner pulley 208, and an intermediate portion 209 removably locked or engaged to the tensioner arm with a spring biased and/or interference fit. For example, the tensioner arm may include a slot 210 which provides a spring biased and/or interference fit for the belt keeper, holding the belt keeper in the locked position. For example, the operator may insert the intermediate portion of the belt keeper into slot 210, and reversibly stretch or bend the spring loaded belt keeper and/or slot to slide the intermediate portion into the locked position.

Having described the preferred embodiment, it will become apparent that various modifications can be made without departing from the scope of the invention as defined in the accompanying claims.

The invention claimed is:

1. A mower drive belt tensioner arm, comprising:
   an elongate body having a first end and a second end and is pivotably mounted between the first end and the second end to a first rear draft tower on a mower deck;
   a spring connected to the first end of the tensioner arm and urging the first end toward a second rear draft tower on the mower deck;
   a tensioner pulley rotatably mounted to the second end of the tensioner arm; and
   a belt keeper that is pivotably mounted to the second end of the tensioner arm.

2. The mower drive belt tensioner arm of claim 1 wherein the belt keeper is pivotable between a locked position on the tensioner arm and a free unlocked position without tools.

3. The mower drive belt tensioner arm of claim 1 wherein the elongate body is pivotably mounted to a horizontal surface extending from the first rear draft tower.

4. A mower drive belt tensioner arm, comprising:
   a stepped elongate body pivotably mounted to a first rear draft tower that extends upwardly from a mower deck, and a tension pulley rotatably mounted to the stepped elongate body; and
   a wireform belt keeper having a spring biased interfit with the stepped elongate body, and a portion of the wireform being adjacent a perimeter of the tension pulley.

5. The mower drive belt tensioner arm of claim 4 further comprising a spring extending between the elongate body and a second rear draft tower that extends upwardly from the mower deck.

\* \* \* \* \*